(12) United States Patent
Heckard et al.

(10) Patent No.: US 6,714,790 B2
(45) Date of Patent: Mar. 30, 2004

(54) METHOD FOR MASKING THE LOCATION OF A MOBILE SUBSCRIBER IN A CELLULAR COMMUNICATIONS NETWORK

(75) Inventors: Max Allen Heckard, Gilbert, AZ (US); Tommy Wai-Hing Tsui, Chandler, AZ (US); Jerry Shihkuo Tang, Chandler, AZ (US); David Jesus Garcia, Chandler, AZ (US); Dean Paul Vanden Heuvel, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 581 days.

(21) Appl. No.: 09/741,493

(22) Filed: Dec. 19, 2000

(65) Prior Publication Data

US 2002/0077127 A1 Jun. 20, 2002

(51) Int. Cl.[7] .................................................. H04Q 7/20
(52) U.S. Cl. ................. 455/456.1; 455/456.5; 455/457
(58) Field of Search ............................. 455/457, 456.1, 455/432, 406, 436, 446, 422.1, 456.6, 456.4; 342/450, 452, 357; 380/247, 250; 701/207, 208

(56) References Cited

U.S. PATENT DOCUMENTS

| | | | | |
|---|---|---|---|---|
| 5,586,167 A | * | 12/1996 | Handforth | 455/456.2 |
| 6,226,589 B1 | * | 5/2001 | Maeda et al. | 701/207 |
| 6,313,786 B1 | * | 11/2001 | Sheynblat et al. | 342/357.02 |
| 6,473,031 B1 | * | 10/2002 | Harris | 342/357.09 |

* cited by examiner

*Primary Examiner*—Erika Gary
(74) *Attorney, Agent, or Firm*—Frank J. Bogacz

(57) ABSTRACT

A method for masking a location (142) of a mobile subscriber in a cellular communications network is disclosed. The subscriber location (142) is masked by dividing a territory of cellular coverage into a grid (100) of cells (102–118) and dislocating the actual location (142) to a center of a cell (124) or to a point within a circle (140).

4 Claims, 1 Drawing Sheet

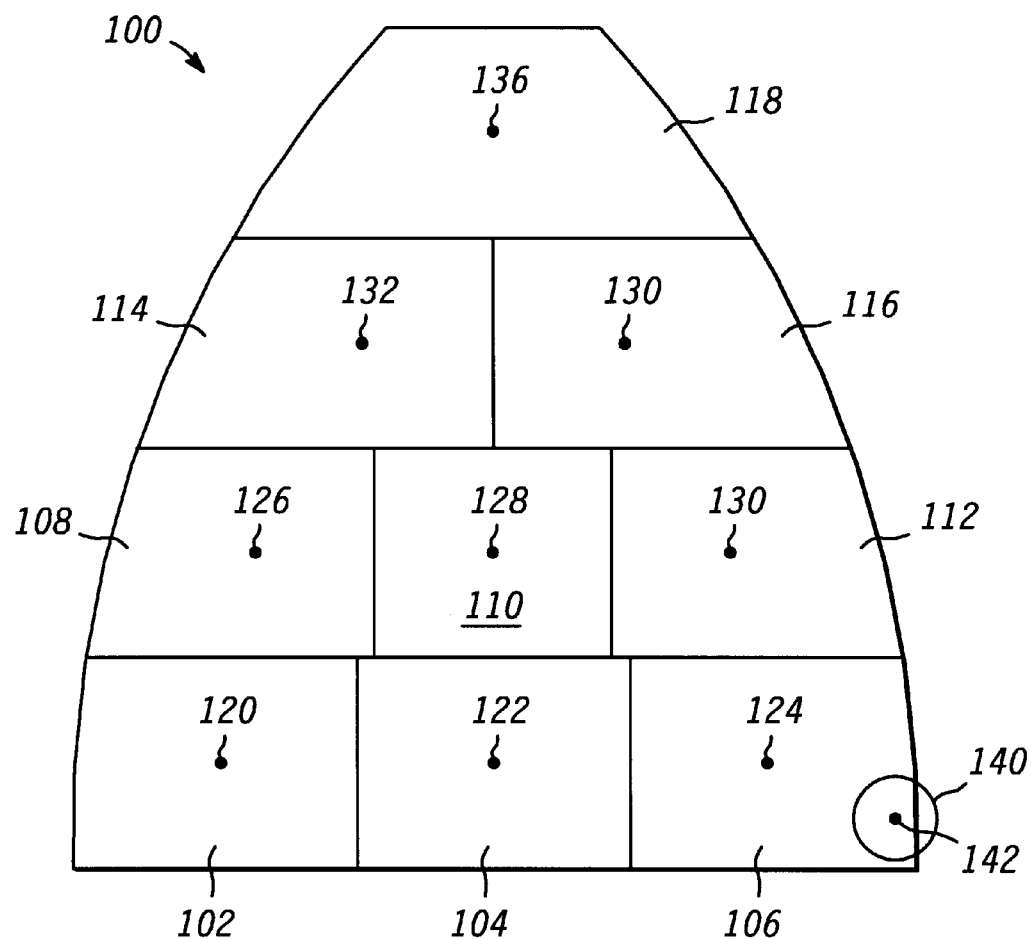

METHOD FOR MASKING THE LOCATION OF A MOBILE SUBSCRIBER IN A CELLULAR COMMUNICATIONS NETWORK

TECHNICAL FIELD

The present invention relates, generally, to techniques for masking the location of a mobile subscriber in a cellular communications network and, more particularly, to techniques for mitigating third-party inference of the mobile subscriber location.

BACKGROUND ART AND TECHNICAL PROBLEMS

Presently known wireless communication networks, for example, cellular telephone networks, utilize information relating to the physical location of a subscriber (e.g., a cellular telephone user) to assist the provider in such matters as determining billing charges for roaming, long distance, and the like, as well as for network resource allocation. The need for accurate location information pertaining to subscribers is thus self-evident.

Typically, the cellular system infrastructure determines the location of the subscriber when a call is placed, or when a subscriber first activates the mobile device. Methods for mobile location determination are well known, and vary from system to system. Location information is determined by the system infrastructure, and is often transmitted to the subscriber mobile device over the wireless signaling channel. Techniques have been developed to allow unauthorized third-parties to "listen" or "sniff" the wireless transmission which could enable the unauthorized listener to determine the location of a subscriber without that subscriber's knowledge or consent. A technique is thus needed which allows the network provider to monitor subscriber location within a satisfactory degree of accuracy, while also preserving the subscriber's privacy. Concealing the location information from unauthorized third parties in order to mitigate safety and security concerns associated with unauthorized distribution of subscriber location information is desired.

BRIEF DESCRIPTION OF THE DRAWING

The subject invention will hereinafter be described in conjunction with the appended drawing figure, wherein the referenced numerals in the drawing FIGURE correspond to the associated descriptions provided below, and the drawing figure illustrates a schematic block diagram of a location area code (LAC) region decomposed into multiple LAC cell boxes by overlay of a LAC snap grid, illustrating a partitioning of the region into a plurality of snap regions in accordance with a preferred embodiment of the present invention.

DETAILED DESCRIPTION OF THE DRAWING

The present invention provides algorithms for masking the location point of a subscriber within a wireless communications network, so that knowledge of the resultant masked point or a plurality of masked points is insufficient to infer the actual location of the subscriber. At the same time, the range of inaccuracy is limited to a predetermined target region to allow the network provider to control performance, access, billing, call monitoring, and network resource allocation within acceptable limits. Although the techniques of the present invention do not require conventional encryption techniques, encryption techniques may also be employed in conjunction with the techniques of the present invention as desired. The invention further includes multiple masking methods to reduce vulnerabilities associated with any particular masking method.

Cellular communication networks typically divide the territory of cellular coverage into a series of contiguous regions, each of which is known as a location area code (LAC). A cellular provider typically uses LAC information to allocate resources, derive billing parameters, or accept or deny user service requests.

These LAC regions can be further segmented, using a regular division, into sub-LAC regions. This can be accomplished by the superimposition of a set of grid lines over the target LAC region. These sub-LAC regions can be referred to as "LAC cell boxes". The set of grid lines is called the "LAC snap grid". For purposes of illustration, an exemplary LAC region 100 is shown in the drawing figure. LAC cell boxes, 118, 114, 116, 108, 110, 112, 102, 104, and 106 are also shown. In the northern hemisphere, LAC cell boxes are typically slightly narrower at the northern extreme and wider at the southern extreme, reflecting the decreasing distance between longitudinal lines toward the North Pole.

LAC region 100 includes four rows of LAC cell boxes; the first (most southern) row includes perspective cells 102, 104, and 106 having respective centers 120, 122, and 124; the second row includes cells 108, 110, and 112 having respective centers 126, 128 and 130; the third row includes cells 114 and 116 having respective centers 132 and 134; and the fourth (most northern) row comprises cell 118 having a center 136. In a preferred embodiment, each row within LAC region 100 is of equivalent length (measured along the north/south dimension), and each cell within the same row is of equivalent width (measured along the east/west dimension), although the cell width need not be the same for all rows. In accordance with a particularly preferred embodiment, for a given row of cells (also referred to as a "snap row") the number of cells should be the smallest positive integer greater than or equal to the snap row width divided by the maximum allowable width for any cell, but other sizes can also be used. The maximum allowable width for a cell may be determined as a function of the maximum desired displacement between an actual location and a masked location; in a particularly preferred embodiment, maximum allowable cell width is equal to the maximum displacement times the square root of 2. Other cell widths can also be accommodated. Also in accordance with a particularly preferred embodiment, an average displacement between actual locations and masked locations is in the range of approximately 100 kilometers, but other limits may be used.

A location masking algorithm in accordance with the present invention employs two basic methods for displacing an unmasked location point to a masked location. One method is called Snap-to-Grid and the other is referred to as Random Displacement. Each of these methods has distinct advantages and disadvantages associated therewith, and thus may be selectively employed according to predetermined criteria as described in greater detail below.

The Snap-to-Grid method essentially entails displacing all actual (unmasked) locations within a particular cell to the center of the cell. For example, if a cellular telephone subscriber is actually at a point 142 in the drawing figure, the reported location will be displaced to center 124 of cell 106. Indeed, all actual cell locations within cell 106 will be masked, and subsequently reported as the location of center 124. Similarly, all locations within cell 104 will be masked and reported as center 122 and so on.

One drawback to the Snap-to-Grid method involves masking a subscriber who is either crossing from one cell to another or who is stationary near a border between two cells. Given that even actual location technology results in some residual statistical error, if an unauthorized listener detects masked locations corresponding to centers of adjacent cells for a period of time, that listener could infer that the actual (unmasked) location of the subscriber is in the vicinity of the border between the two cells. For example, if a location corresponding to center 120 is detected and shortly thereafter a location corresponding to center 122 is detected, it could be inferred that the actual location of the subscriber is in the vicinity of the border between cell 102 and cell 104. Left unaddressed, the ability to infer an actual location from a series of masked locations compromises the effectiveness of a location privacy technique.

The present invention further contemplates the use of a second location masking method, referred to herein as a Random Displacement method. The Random Displacement method displaces an actual location to some point within a circle having a predetermined radius from the actual location of the subscriber. The Random Displacement method may be implemented using the following steps:

(a) Select a value r at random from values uniformly distributed within the interval [0,1], where 1 is a scaled representation of the desired radius of the circle of random displacement;

(b) Set s equal to the square of r;

(c) Set the displacement magnitude to s multiplied by the radius of the circle of random displacement; and (d) The angle $\vartheta$ of displacement is selected at random from values uniformly distributed within the interval [0,2B].

As an illustration of the Random Displacement method, consider a subscriber at a location 142 in LAC grid 100. Using the Snap-to-Grid method, location 142 would be displaced to center 124. Using the Random Displacement method, however, actual location 142 would be displaced in accordance with the foregoing steps to a random point within a circle of random displacement 140.

One advantage of the Random Displacement method is that it increases the difficulty of inferring an actual location from one or more masked location reports when a subscriber is actually located in regions near the border between adjacent cells. One disadvantage associated with the Random Displacement method, however, is that the Random Displacement method may result in a masked location which is outside of the LAC region which contains the actual location of the subscriber. Because subscribers are often billed in accordance with their service locations, or differing services may be offered by location, it is in this regard, desirable that all masked locations remain within the actual LAC region containing the actual location.

To alleviate the foregoing problem, an enhanced version of the Random Displacement method involves only allowing masked location points to be used which lie within both the circle of random displacement 140 and the LAC grid 100 within which the center of circle 140 lies. In accordance with one embodiment of the invention, if the masked location point initially falls outside grid 100, the point is moved to a masked point, which is 180 degrees opposite the initial masked point and within circle 140. An alternate method would employ a repeated or iterative location masking until a suitable location matching both criteria is determined.

In accordance with a further aspect of the present invention, various other circumstances may be developed and appropriate parameters identified to determine when the Snap-to-Grid method should be employed and when the Random Displacement method should be employed. For example, for very small LACs, it may be desirable to use the Snap-to-Grid method, inasmuch as it may be possible to infer the actual location of a subscriber using the Random Displacement method when a large number of masked data points are accumulated. In addition, if a particular LAC comprises only a single cell, or if a particular row in a LAC grid comprises only one cell, it may be desirable to employ the Snap-to-Grid method as opposed to the Random Displacement method. Of course, either or both of the aforementioned methods may be employed, alone, together, or in conjunction with one or more additional location masking methodologies.

Although the present invention has been described with reference to the drawing figure, those skilled in the art will appreciate that the scope of the invention is not limited to the specific forms shown in the figure. Various modifications, substitutions, and enhancements may be made to the descriptions set forth herein, without departing from the spirit and scope of the invention which is set forth in the appended claims.

What is claimed is:

1. A method for mapping an actual location to a masked location for subscribers accessing a cellular telephone network, comprising the steps of:

dividing a territory of cellular coverage into a plurality of snap grids, with each snap grid comprising a plurality of cells, and each cell having a center;

detecting an actual location of said subscribers;

displacing said detected actual location to a corresponding center of a cell containing said actual location;

transmitting, within said cellular telephone network, said center as a masked location corresponding to said actual location;

said cellular telephone network of a type comprising a plurality of grids, each grid having at least one row and each row having at least one cell having a center;

detecting an actual location of a subscriber and determining a number of rows and a number of cells in each row associated with a corresponding grid; and if said corresponding grid comprises one row, or if the row in which said actual location is located contains only one cell, then displacing said actual location to said center.

2. The method of claim 1, further comprising the step of:

if said corresponding grid comprises more than one row, and the cell within which said actual location is associated with is within a row having more than one cell, then masking said actual location in accordance with a Random Displacement method.

3. The method of claim 2, wherein said masking step comprises randomly selecting a point within a random displacement circle having a radius extending from said actual location.

4. The method of claim 3, further comprising the steps of:

determining whether said displaced actual location falls within said corresponding grid; and if said displaced actual location falls outside of said corresponding grid, then masking said actual location to a point 180 degrees opposite said displaced actual location within said random displacement circle.

* * * * *